INVENTOR.
Robert L. Jackson, Jr.
BY Edward M. Steinberg

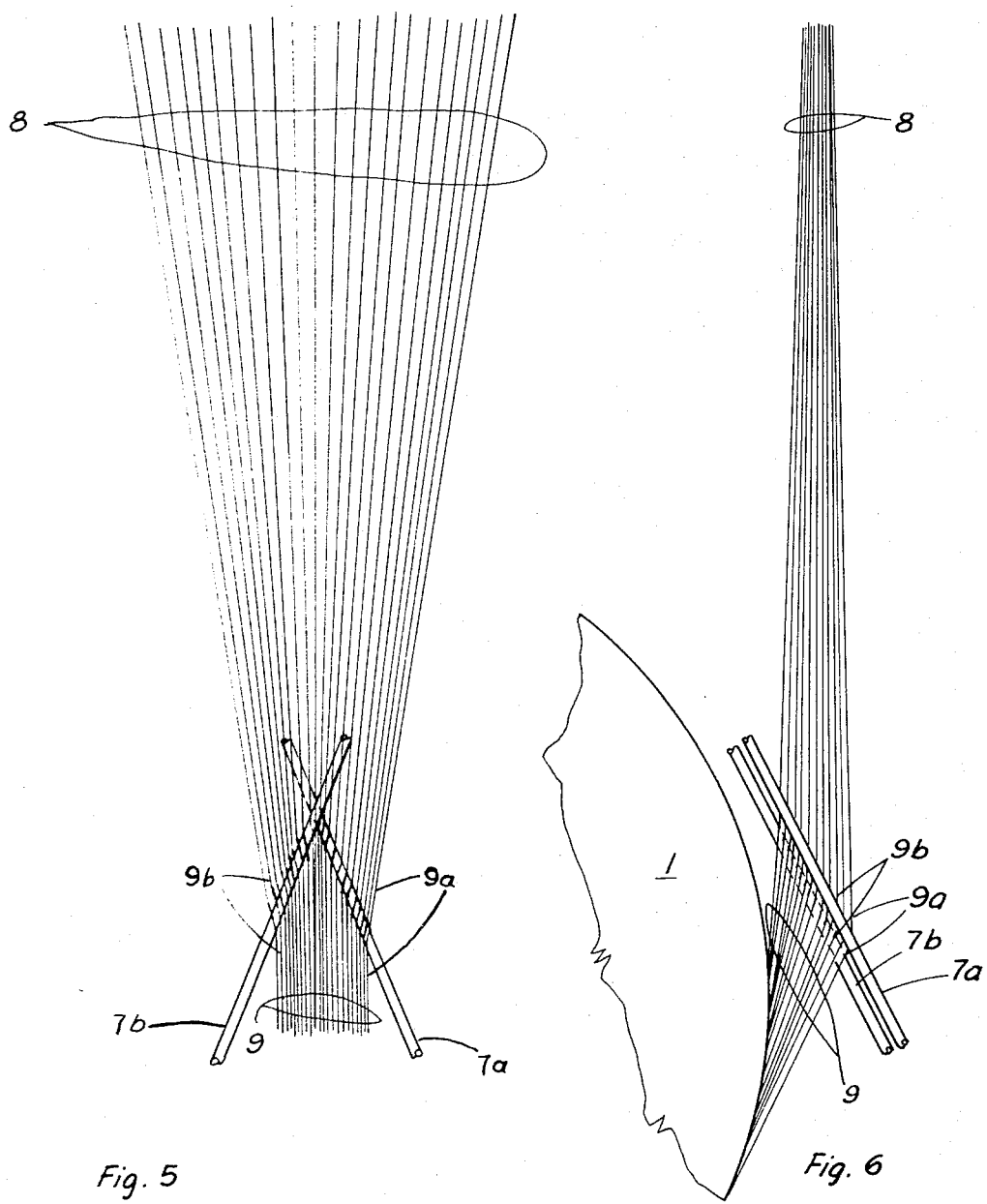

United States Patent Office 3,438,587
Patented Apr. 15, 1969

3,438,587
METHOD FOR MAKING A FILAMENTOUS MAT
Robert L. Jackson, Jr., Louisville, Ky., assignor to American Air Filter Company, Inc., Louisville, Ky., a corporation of Delaware
Filed Aug. 4, 1967, Ser. No. 658,475
Int. Cl. B65h 54/00, 57/00, 57/28
U.S. Cl. 242—42                    10 Claims

ABSTRACT OF THE DISCLOSURE

An apparatus and method for winding a curtain of filaments onto a rotating collector which includes filament guide means disposed between a reciprocating feeder and a rotating drum to narrow the width of a selected portion of the curtain of filaments. The guide can be adjustable to selectively narrow the width of the curtain of filaments and to decrease the spacing between individual filaments deposited on the drum without bringing the individual filaments into contiguous relation.

Background of the invention

One previous method and apparatus for collecting a curtain of filaments on a rotating drum includes filament feeder means, for example a glass melting furnace, successively reciprocated axially parallel to the downturning edge of the drum so a filament curtain is wound on the drum to form a multi-layer filamentous mat. The successive layers of filaments of the mat correspond to successive traverses of the feeder along the drum and the filaments of each layer lie in crossing relationship with filaments of the immediately preceding layer. In some applications the mat so formed is slit axially of the drum and removed as a planar mat. In such method and apparatus, the feeder is stopped and the direction of travel is reversed at each end of the drum. The end portions of the filamentous mat, formed in the feeder end reversal areas, are of significantly different, undesirable characteristics from the portion of the mat formed between the end reversal areas. The width of each end portion generally approximates the width of the curtain of filaments drawn from the feeder and is generally considered scrap to be trimmed from the finished mat and discarded as waste.

It is, of course, desirable to decrease the portion of the mat in the end reversal areas and one method of doing this is by decreasing the width of the curtain. In some instances the width of the feeder has been decreased without a compensating increase in any other dimension of the feeder, but the smaller feeder correspondingly decreases the quantity of glass drawn from the feeder per unit of time and therefore increases the amount of time required to form a completed mat on the drum.

In other methods and apparatus the width of the filament feeder, parallel to the axis of the drum, has been decreased with a corresponding increase in length of the feeder in a direction transverse the longitudinal axis of the drum so the same number of filaments issue from the feeder. In such apparatus the separation between the filaments is necessarily very small, and in many cases the filaments are undesirably deposited on the rotating drum in contiguous relation as groups of filaments rather than as separated filaments. The relatively narrow curtain of filaments permits such apparatus to likewise be used to wind a curtain of filaments onto a rotating drum in the form of separated convolutions, or wraps, to provide a filamentous mat of certain desired characteristics. This is accomplished by careful correlation between the rotational velocity of the drum and the traversing velocity of the filament feeder to prevent overlapping between successive convolutions of the curtain.

In other previous apparatus the width of the curtain of filaments has been reduced by intentionally collecting some of the filaments into multi-filament groups to be deposited on the drum. While the formation of such filament groups does reduce the width of the filament curtain, collected groups are very often not desirable and such an arrangement has not proved to be a satisfactory means for reducing the formation of waste in the end reversal areas of the filamentous mat.

In virtually all previous apparatus for feeding a curtain of separated filaments from a feeder to be collected on a rotating drum, whether a reciprocating feeder is used or not, the separation between filaments wound on the drum is fixed by the separation of the orifices and the separation cannot be significantly changed without modification of the feeder apparatus.

Summary of the invention

The present invention advantageously provides means to narrow the width of the curtain of filaments drawn from a filament feeder to a rotating drum and reduce the separation between the individual filaments of the curtain of filaments, for example glass, without actually resulting in contact between adjacent filaments.

In accordance with another feature of the present invention, the extent of reduction in width of the curtain of filaments wound on the drum and the separation between filaments of the curtain, can be easily and selectively varied during collection of the curtain of filaments without substitution of parts in the filament feeder means or changing the position of the filament feeder means.

Furthermore, the present invention recognizes and provides apparatus and method to reduce the width of a selected portion of a curtain of filaments drawn from a feeder to a collecting means while the remaining portion of the curtain is unaffected. Moreover, the method and apparatus of the present invention recognizes and provides means to narrow the width of a curtain of filaments to decrease the separation between individual filaments and, simultaneously, provide groups of filaments to form a multi-filament strand at a selected location within the curtain of filaments.

In applications where the feeder axially traverses a rotating drum to provide a filamentous mat of successive layers of crossing filaments on the rotating drum the present invention recognizes and provides an apparatus to narrow the width of the mat formed in the end reversal area to reduce the amount of waste. Likewise, the present invention provides an economical means to narrow the width of the curtain of filaments drawn from a feeder, which axially traverses the rotating drum, so the filaments can be alternately wound on the rotating drum as separate convolutions or overlapping convolutions by merely making an appropriate adjustment in the collecting device without modifying the position, size or traversing speed of the feeder.

Various other features of the present invention will become obvious to those skilled in the art upon reading the disclosure set forth hereinafter.

More particularly, the present invention provides a filament winding apparatus comprising: filament feeder means to feed a curtain of filaments; rotating filament collector means to receive the curtain of filaments fed from the feeder means; filament guide means, including filament contacting edge means, disposed between the feeder and the collector so the filament contacting edge is at an acute angle with the normal path of filaments from the feeder to the drum and a portion of the filaments of the filament curtain contact the edge whereby the width, measured parallel to the axis of said collector means, of a portion of the filament curtain contacting the edge means is narrowed and the narrowed curtain of filaments is supplied to the collector means.

It is to be understood that the description of one example of the present invention given herein is not by way of limitation, and that various changes can be made in the arrangement, form, or construction of the method and apparatus disclosed herein without departing from the scope or spirit of the present invention.

Referring now to the drawings:

FIGURE 5 is an enlarged illustration of one example of collection of filaments in accordance with the present invention;

FIGURE 6 is an enlarged schematic illustration of another view of collection of filaments in accordance with the present invention; and, FIGURES 7a and 7b are schematic diagrams of the effect of the use of apparatus in accordance with the present invention.

Figure 1:
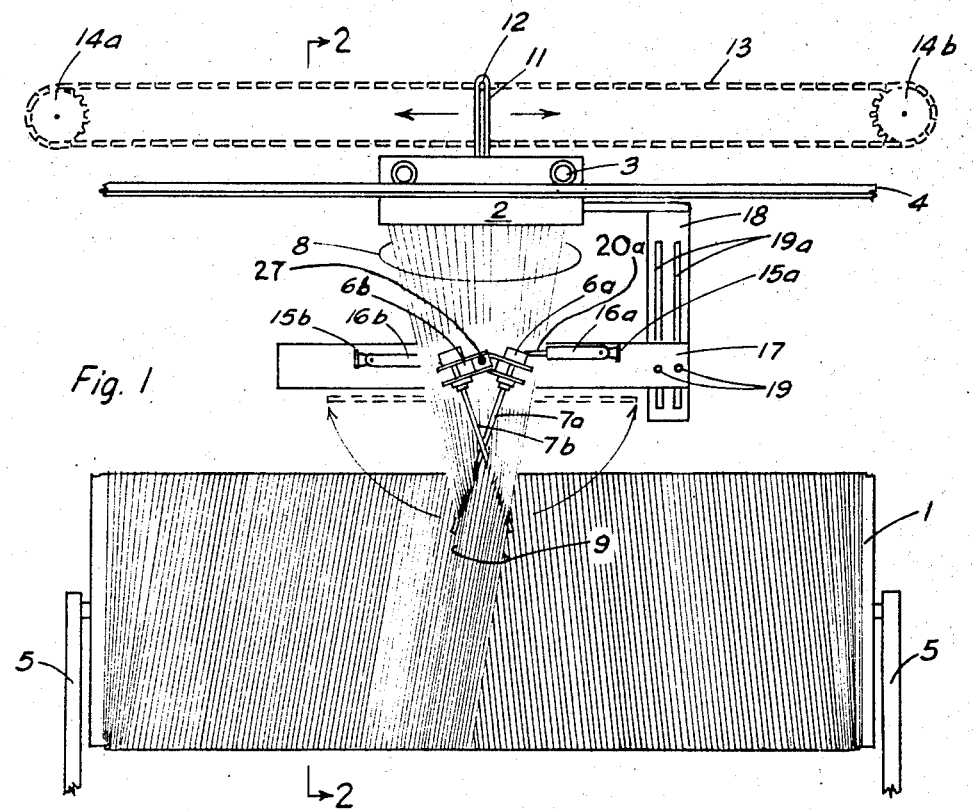
FIGURE 1 is an elevational view of an apparatus in accordance with the present invention.

In the example of one apparatus in accordance with the present invention as shown in the figures a drum 1 is mounted between supports 5 for rotation about its longitudinal axis. A filament feeder 2, which can be a glass melting furnace to feed a curtain of separated glass filaments, is disposed above a downturning edge of the drum and is adapted to axially traverse the rotating drum while the curtain of filaments 8 is drawn from the feeder to the rotating drum. In accordance with one feature of the present invention, a filament guide means 7, as hereinafter described, is disposed between the feeder and the rotating drum to narrow the width of the curtain of filaments 8 so a narrower curtain of filaments 9 is wound on drum 1.

Figure 2:
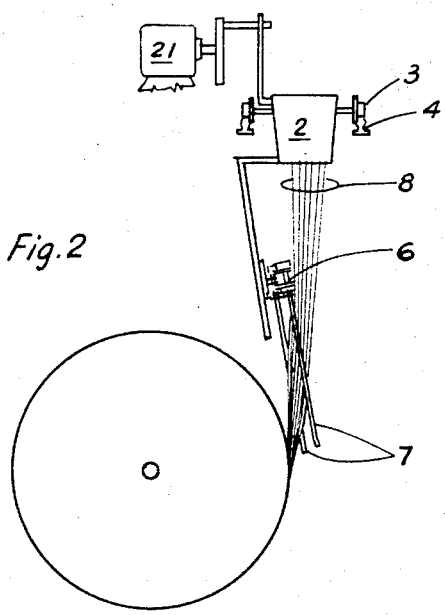
FIGURE 2 is a view taken along a plane passing through line 2—2 of FIGURE 1.

Drum 1 can be of selected length and diameter and is mounted between bearing supports 5 for rotation about its longitudinal axis (by means not shown). Feeder 2 is supported on cooperative wheels 3 to roll easily back and forth along tracks 4, which are disposed above a downturning edge of drum 1 in generally parallel relationship to the longitudinal axis of drum 1 as shown by FIGURE 2, so the filaments can be drawn from the feeder to the downturning edge of the drum.

Feeder 2 also includes an upstanding arm 11 having a slot 11a to receive a pin 12 which pin 12 is adapted to move freely in a vertical direction within slot 11a. Feeder 2 is driven back and forth along tracks 4 in successive reciprocatory traverses by pin 12 which is attached to an endless belt 13, for example a chain belt. Belt 13 is suspended between a drive sprocket 14a at one end and idler sprocket 14b at the other end where the spacing between sprockets 14a and 14b is selected in accordance with the desired width of the filamentous mat to be formed on drum 1. Sprocket wheel 14a is driven at selected speed by means of drive motor 21 to move feeder 2 back and forth along tracks 4 at selected speed.

It will be noted that as feeder 2 approaches each end of the tracks pin 12 passes around a sprocket (14a or 14b) so feeder 2 slows to a stop and reverses direction in accordance with the movement of pin 12 around the sprocket. In the central portion of the drum the filaments lie in generally parallel relation because the feeder traverses this portion of the drum at uniform speed. But during the end reversal period, when the feeder stops and reverses direction, the filaments are deposited on rotating drum 1 at various helical angles, as shown in FIGURE 1, in accordance with the decreasing and increasing speed of feeder 2. When the feeder is in the stopped position at the very end of the traverse the filaments are deposited in a position nearly transverse to the longitudinal axis of drum 1. The portion of the mat formed in the end reversal areas is approximately equal to the width of the feeder 2 and is tapered because of the decreasing number of filaments deposited toward the outer portions of the end reversal areas. It will be realized that the number of filaments decreases toward the outer portion of the area because the entire width of feeder 2 does not pass over the entire end reversal area to deposit every filament across the entire area.

The guide means, as provided by the present invention, include at least one filament contacting surface disposed between the feeder and the collector at an acute angle relative to the normal uninterrupted path of the filaments from the feeder to the collector. In the example as shown in the drawings the guide means includes two probe assemblies which are similar and it will be understood throughout the following description that the *a* and *b* subreferences, where used, refer to the respective probe assemblies. Probes 7a and *b* of the assemblies can be, for example, carbon rods which are disposed to contact a selected portion of filament curtain 8. It will be noted, FIGURE 2, that each probe is disposed so the longitudinal axis of the probe forms an acute angle with the path of the filaments from the feeder 2 to drum 1 and contacts a portion of the curtain of filaments. While for purposes of the present example the probes are shown as directed downwardly, it will be understood that the probes can likewise be directed upwardly.

Figure 3:
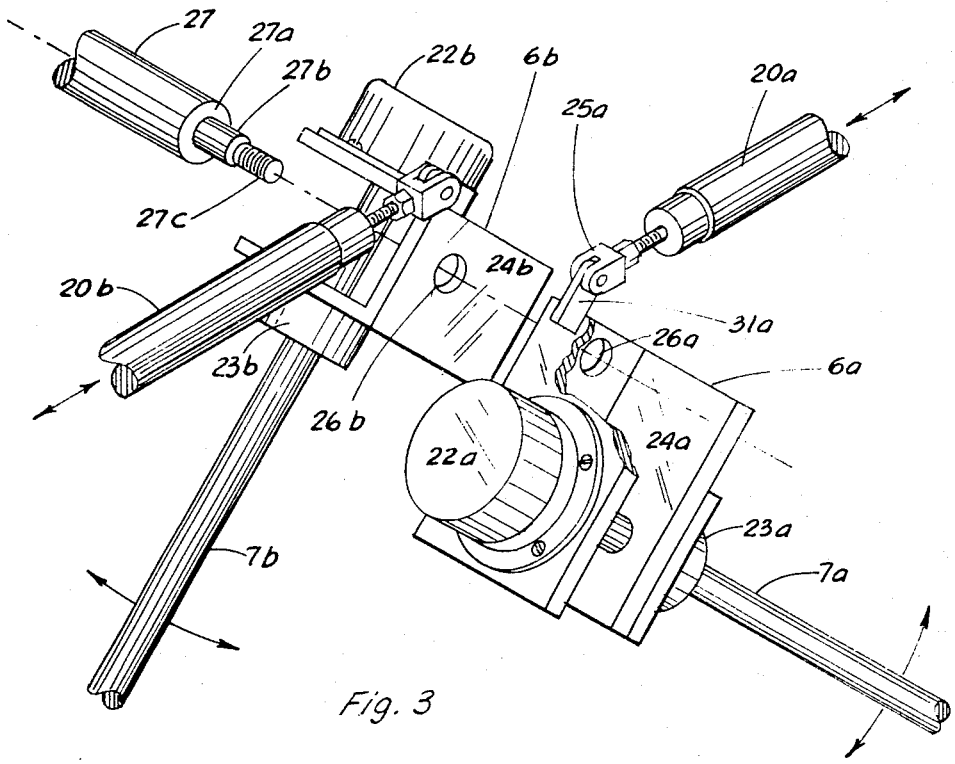
FIGURE 3 is an enlarged, exploded view of an example of a filament collecting apparatus in accordance with the present invention.

Each of the probes 7a and 7b is received by a probe holder 6a and 6b, respectively where each probe is suitably mounted for pivotable movement to rotate probes 7a and *b* to selected position. Referring to FIGURE 3 which shows an exploded, enlarged view of the pivotable holders 6a and *b*, each can comprise a channel 24a and *b* respectively having a bearing 23a and *b* to receive probe 7a and *b*, where each probe 7a and *b* extends through respective channel 24a and *b* and is connected to a motor 22a and *b* respectively which can be, for example, a fractional horsepower electric motor. Motors 22a and *b* are provided to rotate each probe 7a and *b* at a selected speed so the abrasive action of the filaments passing over the surface of the probe is distributed uniformly around the circumference of the probe and grooves are not worn into the probe. Holders 6a and 6b are pivotably mounted in overlying relation on a pivot 27 fixed to an arm 17 (FIGURES 2 and 3). Pivot 27 provides a reduced shank portion 27b cooperatively sized to be snugly received by apertures 26a and 26b of holders 6a and 6b, respectively. It will be noted that holder 6b rests on shoulder 27a of arm 27 and the flat surface of channel 24a of holder 6a rests on the flat surface of channel 24a of holder 6a. If desired, a spacer can be provided between holders 6a and 6b. Arm 27 includes a threaded portion 27c to receive a fastener to retain holders 6a and 6b for pivotal movement on pivot arm 27.

As shown by the dotted lines of FIGURE 1, probe assemblies 6a and 6b can be independently pivoted to move probes 7a and 7b from a position generally parallel to arm 17 to a position in crossing relationship to define a V-shaped filament collection area between the probes to encompass all, or a selected portion, of the width of filament curtain 8.

Pivotable holders 6a and 6b can be rotated on shank portion 27b by a suitable means, for example hydraulic cylinders 16a and 16b selectively powered by means (not shown) to selectively adjust the position of probes 7a and *b*. One end of cylinders 16a and 16b are pivotably fixed to arm 17 by anchors 15a and 15b, respectively while the piston arms 20a and *b* (FIGURE 3) of each of the cylinders 16a and 16b can be attached, respectively, to probe holders 6a and 6b by means of knuckles 25a and *b* which are attached to anchors 31a and *b* provided for each holder 6a and *b*. The arrangement as shown permits freely pivotable movement of holders 6a and b by cylinders 16a and b in response to movement of piston arms 21a and b.

The filament guide assembly mounted on arm 17, as hereinbefore described, is supported from an arm 18 which is attached to feeder 2 so that the filament guide means moves with feeder 2 in successive axial traverses along drum 1. Arm 18 can include slots 19a to receive fasteners 19 so that, as shown, the position of arm 17 can be adjusted with respect to feeder 2 by sliding arm 17 along slots 19a.

In operation, filament feeder 2 traverses rotating drum 1 and filament curtain 8 of separated filaments, for example glass, is drawn from feeder 2 through orifices in an orifice plate in feeder 2. Operation of the apparatus as shown can be initiated with probes 7a and 7b in a position parallel to arm 17, as shown by the dotted lines of FIGURE 1, so the curtain is drawn full width from feeder 2 to drum 1. When it is desired to narrow the width of the band of filaments, cylinder 16a and 16b can be actuated to pivot holders 6a and 6b so probes 7a and 7b are positioned to define the V-shaped collection area and contact curtain 8 to displace a portion of the filaments to narrow the width of the curtain of filaments to form the narrowed filament curtain 9, as shown.

As shown schematically in FIGURE 5, curtain 8 is drawn downward in ever narrowing width to probes 7 and the filaments which contact probes 7a and 7b, are redirected by the probes so the width of the curtain 9 is uniform between the probes and the drum and the filaments are in mutually parallel relationship. Considering, for example, two filaments 9a and 9b, the filaments are drawn from the opposite sides of the feeder and filament 9a contacts probe 7a while filament 9b contacts probe 7b so both are drawn to drum 1 in parallel relationship.

Figure 7A:
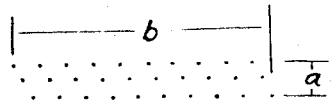
Figure 7B:
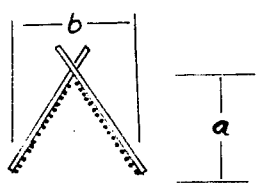

In accordance with one feature of the present invention it has been recognized that when each probe is disposed in a plane oblique to the normal path of filaments from the feeder to the drum the filaments of curtain 8 are distributed along probes 7 in accordance with the path of least resistance from feeder 2 to drum 1. In the example shown where the probes are within a plane oblique to the normal path of filaments from the feeder to the drum and form a V-shape collecting area which opens downwardly, the filaments move along probes 7 away from drum 1 so virtually all of the filaments move to a position further away from drum 1 than if they did not contact probes 7 as shown in FIGURES 7a and 7b. FIGURE 7a represents the pattern of filaments as drawn from feeder 2 and the pattern in which the filaments are drawn to drum 1, if the filaments are not displaced from their normal path. FIGURE 7b is a schematic illustration showing the pattern the filaments assume if filament collecting means in accordance with the present invention are interposed between the feeder and the rotating drum. It will be noted that, as shown, the width (b) of the curtain is reduced while the depth (a) of the curtain is increased because the filaments move along the probes. The present invention recognizes that because of the angular position of the probes within a plane oblique to the normal path of the filaments and because each filament moves to a position of at least resistance, the separation of filaments in a direction transverse to the longitudinal axis of drum 1 is increased, while the separation between filaments in a direction parallel to the longitudinal axis of the drum is decreased as shown in FIGURES 7a and 7b. Furthermore, in accordance with the present invention it has been recognized that the separation between the filaments is affected by the angle between the normal path of the filaments from the feeder to the rotating drum. For example, if probes 7 were disposed at right angles to the normal path of travel of the filaments a number of the filaments would travel directly to the point where the probes cross, and thus would be grouped. It has been found that by disposing the probes at increasingly acute angles to the normal path from the feeder to the collector the separation between the filaments in a plane transverse to the longitudinal axis of the drum is increased and the opening between the probes can be decreased to decrease the separation between filaments in a direction parallel to the axis to narrow the width of the filament curtain without gathering filaments at the point where the probes cross.

Figure 4:
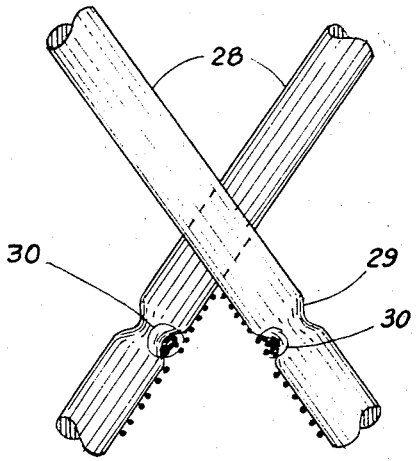
FIGURE 4 is an enlarged schematic drawing of another filament collecting means in accordance with the present invention.

FIGURE 4 is an illustration of one modification of the probes and shows probes 28 having grooves 29 so that some of the filaments are selectively collected into multifilament strands 30, even though the probes are disposed at an angle relative to the normal path of the filaments from the feeder to the drum and normally no grouped filaments would be formed. It will be realized that by proper selection of the location of grooves 29 on probes 28, the filament groups can be interposed at any point within the narrowed filament curtain and the remaining filaments are distributed along the probes.

Furthermore, it has been recognized that in addition to narrowing the band of filaments to decrease the waste normally associated with the end reversal area, the apparatus in accordance with the present invention, as shown in the example, provides means to selectively vary the width of the curtain of filaments deposited on the rotating drum during the formation of a filamentous mat to provide unique characteristics not available with present apparatus. For example, a portion of the mat can be formed with a full width filament curtain and other portions of the mat can be formed with selectively narrowed filament curtains so the filaments of certain layers of mat are closer together than the filaments of other layers.

Likewise, without changing the traversing speed of the feeder or the position of the feeder, the width of the curtain of filaments can be selectively narrowed so separated convolutions are wound on the drum.

Moreover, it has been recognized that the method and apparatus of the present invention is not restricted to applications using a traversing feeder and can likewise be used in conjunction with a fixed feeder.

The invention claimed is:

1. A filament winding apparatus comprising: filament feeder means to feed a curtain of filaments; rotating filament collector means to receive said curtain of filaments fed from said filament feeder means; and, filament guide means, having filament contacting edge means, disposed beween said feeder and said collector so said filament contacting edge means is disposed in a plane at an acute angle with respect to the normal path of filaments from said feeder to said rotating collector so a portion of said filaments of said curtain contact said edge means whereby the width, measured parallel to the rotational axis of said collector means, of a portion of said filament curtain contacting said edge means is narrowed and the narrowed curtain of filaments is supplied to said collector means.

2. The apparatus of claim 1 wherein said filament guide means includes elongated probe means disposed in crossing configuration to form a V-shaped collecting area so that filaments of said curtain of filaments contact said probes within said V-shaped collecting area to narrow the width of said curtain.

3. The apparatus of claim 1 wherein said probe means have grooves located so filaments contacting said probe means are collected in said grooves to form multifilament groups to be supplied to said collector means with said narrowed curtain of filaments.

4. The apparatus of claim 2 wherein said probe means are rotated at selected speed so the area of contact between said filaments and said probe means is uniformly distributed around said probe means.

5. The apparatus of claim 1 including means to selectively insert said filament guide means into said filaments curtain to narrow the width of said filament curtain.

6. Filament winding apparatus to form a multi-layer filamentous mat comprising: filament feeder means to feed a curtain of filaments; filament collecting cylindrical drum means to receive said curtain of filaments fed from said feeder means; means to rotate said drum about its longitudinal axis; means to axially reciprocate said feeder means in successive axial traverses along a downturning edge of said drum collector means; and, filament guide means, having filament contacting edge means, disposed between said feeder and said drum so said filament contacting edges are disposed in a plane at an acute angle with respect to the normal path of filaments from said feeder to said drum so a portion of the filaments of said filament curtain contact said edge means whereby the width, measured parallel to the longitudinal axis of said drum, of the portion of said filament curtain contacting said edge means, is narrowed and the narrowed curtain of filaments is supplied to said collector means.

7. Apparatus of claim 6 including means to move said filament guide means in successive axial traverses in fixed, cooperative, relation with said filament feeder means.

8. The apparatus of claim 7 wherein said filament guide means includes elongate probe means disposed in crossing relation to form a V-shaped collecting area where filaments of said filament curtain contact said probes within said V-shaped collecting area to narrow the width of said curtain of filaments.

9. The apparatus of claim 8 including means wherein said probe means are pivotably mounted to be selectively rotatable into position against said filament curtain to narrow the width of said filament curtain.

10. A method for making a filamentous mat comprising: feeding filament from a filament feeder means to a cylindrical drum means; traversing said filament feeder means axially along a downturning edge of said drum in successive reciprocatory traverses; rotating said drum a multiplicity of times during each traverse of said feeder; selectively displacing a portion of the filaments of said curtain out of a direct line of travel from said feeder to said drum in a direction parallel to the axis of said rotating drum along a line in a plane at an acute angle relative to the direct line of travel from said feeder to said drum so the width of said curtain is narrowed; moving said filament guide means in successive reciprocatory traverses in fixed relation with said feeder means; and, slitting the mat so formed axially of said drum and removing said mat from said drum as a planar mat.

References Cited

UNITED STATES PATENTS

| | | | |
|---|---|---|---|
| 3,092,533 | 6/1963 | Beckner | 156—167 |
| 3,134,704 | 5/1964 | Modigliani | 156—167 |
| 3,382,123 | 5/1968 | Alexander | 156—167 |

STANLEY N. GILREATH, *Primary Examiner.*

U.S. Cl. X.R.

156—167, 174; 242—18, 158, 157